May 15, 1956  P. A. SHAFFER, JR  2,745,804
ELECTROLYTIC TITRATION APPARATUS
Filed April 16, 1946  3 Sheets-Sheet 1

INVENTOR.
PHILIP A. SHAFFER JR.
BY
Christie & Gingas
ATTORNEYS.

May 15, 1956 P. A. SHAFFER, JR 2,745,804
ELECTROLYTIC TITRATION APPARATUS
Filed April 16, 1946 3 Sheets-Sheet 3

INVENTOR.
PHILIP A. SHAFFER JR.
BY
Christie & Rogers
ATTORNEYS

United States Patent Office 2,745,804
Patented May 15, 1956

2,745,804

ELECTROLYTIC TITRATION APPARATUS

Philip A. Shaffer, Jr., Pasadena, Calif., assignor, by mesne assignments, to Consolidated Electrodynamics Corporation, Pasadena, Calif., a corporation of California Application April 16, 1946, Serial No. 662,453

5 Claims. (Cl. 204—195)

This invention is concerned with titration and provides improvements in methods of and apparatus for quantitative analysis. In its preferred form, the invention provides an automatic titrimeter of novel design and permits continuous titration to analyze quantitatively succeeding portions of a flowing stream of fluid. The invention finds application in the analysis of both liquids and gases and is particularly useful for the quantitative detection of constituents occurring in very low concentrations, for example noxious gases in air or residual chlorine in chlorinated drinking water.

In quantitative analysis by titration, a constituent whose concentration in a sample is to be determined enters into quantitative reaction with a titrating agent which is introduced into the sample in known or determinable amount until an "end point" is reached. The end point may be detected in various ways, for example by a color change in the body of fluid, usually liquid, in which the titration reaction takes place, by the formation of a precipitate, or potentiometrically.

Customarily the titration process is conducted by introducing the titrating agent into a batch containing the constituent to be determined quantitatively, the introduction of the agent being controlled mechanically, for example by means of a stop cock on a burette. Such mechanical control has a number of disadvantages, including the fact that it depends upon moving parts in valves, etc. which tend to leak and stick. A further disadvantage resides in the fact that the accuracy of the titration result depends upon the accuracy with which the titrating agent has been prepared, for errors in the concentration of the active ingredient in the titrating agent introduce like errors in the analysis results.

I have developed improvements in titration technique which overcome the disadvantages formerly encountered. In essence, my invention contemplates controlling the amount of titrating agent present in the reaction zone and available for the quantitative titration reaction by electrolysis in situ in the zone and the determination of the amount of the titrating agent consumed in the reaction by measurement of the current consumed in the electrolysis. Thus one aspect of the invention contemplates the electrolytic generation in situ of the titrating agent, the control of the amount generated by controlling the current employed in the electrolysis, and the measurement of the amount of the titrating agent generated by measurement of the current used to generate it. Thus the titration may be conducted in an electrolytic cell into which the sample to be analyzed is introduced, the titrating agent being formed in the cell. The rate at which the titrating agent is formed, and accordingly the total amount of the titrating agent formed in a given time is controlled (in accordance with Faraday's law) by controlling the current input to the electrolysis.

To take a simple example of the practice of the invention, a batch sample of liquid containing a constituent to be determined is placed in an electrolytic cell containing an electrolyte from which the titrating agent is to be generated. Current is supplied to a pair of electrodes in the cell to generate the titrating agent therein. The latter reacts quantitatively with the constituent in the cell unil an end point is reached. When the end point is attained, the current is cut off, for example by the manual operation of a switch. The coulombs involved in producing the titrating agent in the cell are a measure of the amount of the constituent present in the sample.

In another aspect of the invention, the titrating agent may be introduced in known amount in excess of reaction requirements, and the excess consumed by the electrolytic action. This is an application of the invention to "back-titration" in which the excess of the titrating agent left over from the titrating reaction is measured by being consumed electrolytically, the current employed being a direct measure of the excess and an indirect measure of the amount of the titrating agent entering the reaction.

In the application of the invention to a given analysis, it is only necessary to select a method of end point indication (which may be colormetric, potentiometric, et cetera) for the chosen titration reaction and to select a half-cell reaction that will generate the required titrating agent (or perhaps consume an undesired excess of it). Thus the invention may be employed in a variety of titration reactions with various systems of end-point indications, and in continuous or batch operations. A number of such reactions are illustrated in the following detailed description.

By employing a suitable linkage, the end-point indication may be employed to control the supply of current to the generating electrodes, and thus permit automatic titration. A variety of types of control linkages may be employed. If, for example, the end-point indication is a given degree of turbidity caused through the formation of a precipitate in the cell, photoelectric means may be used to measure the turbidity. The photoelectric means, in turn, may be used to control the input current to the generator electrodes so that when excessive turbidity is caused by an excess of the generated titrating agent, the current supplied to the generating electrodes is automatically diminished in amount just sufficient to restore end-point conditions.

Again, a pair of observing electrodes present in the cell may be employed to determine potentiometrically an excess of unreacted titrating agent. An electronic power amplifier connected at its output to the generating electrodes receives as input the varying potential of the observer electrodes and is so constructed that its current output decreases as the excess of the titrating agent (shown by the observing electrodes) increases, and vice versa. On the other hand, if it is an excess of constituent which the observing electrodes measure, the amplifier may be so constructed and connected that its current output increases as the observed excess increases, and vice versa. Alternatively, if the chemical system is such that the titrating agent is consumed in increasing amount with increasing output or "generator" current (equivalent to "back-titration"), the amplifier is arranged to increase the generator current with increasing excess of the titrating agent.

In a continuous automatic titrating operation, the sample containing the constituent to be analyzed and the titrating agent are added to the cell at competitive or equivalent rates, with allowance for a standard excess, generally minute, of one or the other, the control of the amplifier by the observing electrodes or other input control means being in effect an electrical "feedback" in which part of the circuit is chemical. This results in "null point" operation of the titrating mechanism (titrimeter). The current output of the amplifier may be measured with an ammeter or the like and will give a continuous indication of the concentration of the constituent in successive portions of the stream.

In a batch operation, automatically controlled by an amplifier in accordance with the invention, the constituent to be analyzed and the titrating agent are added in equivalent amounts rather than at equivalent rates; the output of the amplifier in terms of coulombs (i. e. amperes times time) is the measure of the amount of the constituent in the sample added; and the amplifier output is reduced automatically to the current required to generate the standard excess when the end-point is attained.

The titration of discrete samples may be carried out utilizing electrolytic means for introduction of the titrating agent (or back-titrating agent) without employing an amplifier, but using instead a source of constant current (for example, a high potential battery in series with a large resistance), the coulombs used in the titration being computed from the current and the time of its passage. The time of passage is most simply controlled by an electrical key or switch.

The preferred automatic titrimeter of my invention thus employs an electrolytic means, say a pair of electrodes, to generate controlled quantities of titrating agent (say bromine) for reaction in a cell with a constituent (say mustard gas) of a fluid sample (say air). Means (say a pair of potentiometric "observer" electrodes) are provided in the cell for detecting and measuring an unreacted excess of one or the other of the reacting substances. A vacuum tube amplifier is provided, and the input thereof is operatively associated with the detecting means and its output is connected to the generating electrode, the arrangement being such that the output current of the amplifier is varied automatically in response to a change in the excess measured by the detecting means so as to generate the titrating agent in amount sufficient to just react with the amount of constituent present.

As I have already indicated, the current supplied as the output of the power amplifier is a measure of the constituent to be determined, stoichiometric balance being maintained, and in an operation in which the fluid to be analyzed runs continuously to the cell, the current flowing at any instant is a measure of the concentration of the constituent in the fluid entering the cell at or about that instant. However, the fluid may also be introduced in discrete samples or batches and titrated with equal ease by measuring the output of the amplifier in terms of coulombs.

In order to assure proper and rapid titration, mixing of the titrating agent with the fluid should be thorough and quick, and to this end it is desirable and sometimes necessary to provide agitating means in the cell. Otherwise, the apparatus may "hunt."

A variety of forms of vacuum tube amplifiers having D. C. output may be employed. They must have ample transconductance, i. e. they must be able to produce relatively large changes in output current in response to small input potential changes. The response of the amplifier need not be linear, because the apparatus operates essentially as a null instrument, but the amplifier circuit should be so arranged that there is substantially no electrical conducting path (external to the solution) between the generating electrodes (i. e. those that produce the titrating agent) and the observing electrodes employed as a determining means. Otherwise, the latter tend to polarize and to be "dominated" by the generating electrodes, thus failing to perform their proper function.

The amplifier should be provided with some means to reduce unrepresentative fluctuations in the potential across the input.

These and other aspects of the invention will be apparent in the light of the following detailed description coupled with the accompanying drawings in which Fig. 1 is a schematic diagram of a preferred form of my titrimeter adapted particularly to the continuous indication of mustard gas concentration in an air stream passing through the apparatus;

Figure 1:
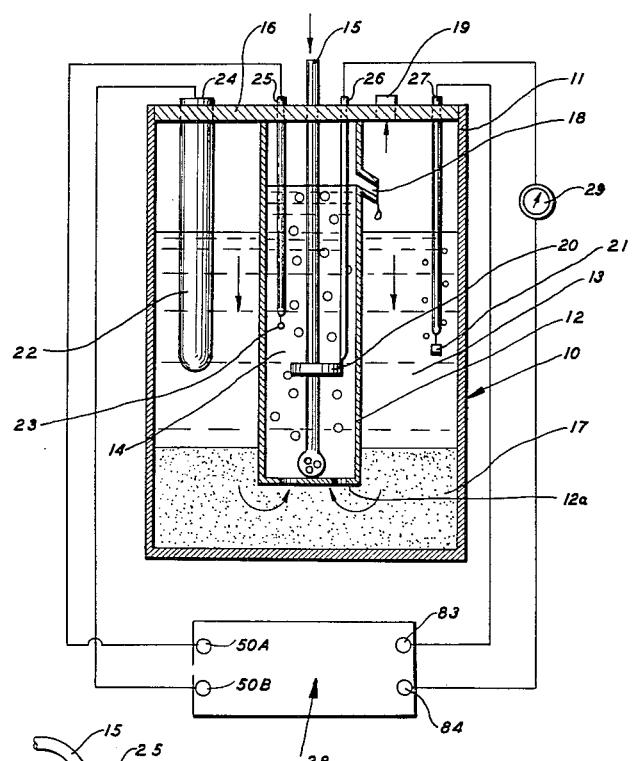
Figure 2:
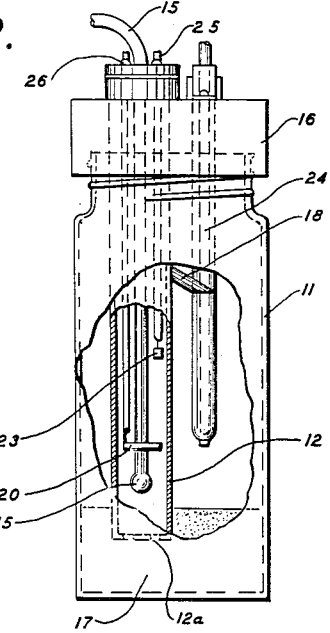
Fig. 2 is an elevation of a cell for use in the apparatus of Fig. 1.
Figure 3:
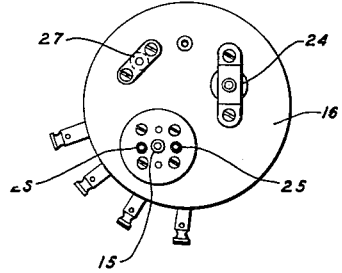
Fig. 3 is a plan view of the cell of Fig. 2.

Referring to Figs. 1, 2 and 3, the cell 10 of the titrimeter comprises an outer vessel 11, conveniently a glass jar, and a vertically disposed inner cylinder 12. The space between the two provides a reservoir 13 for absorbing solution. The space within the cylinder is the actual reaction chamber 14 in which absorption and titration take place.

An air stream suspected of containing mustard gas, the concentration of which is to be measured, passes into the bottom of the cylinder through a vertical disperser tube 15, having small holes in its lower end, which projects down through a cap or seal 16. Entry of the air stream may be brought about by a pump, not shown.

The bottom of the container is filled with granular charcoal 17, and the charcoal is penetrated by and overlain by a pool of aqueous solution, say 3 formal $H_2SO_4$, 0.06 formal $KBr$.

The central cylinder has a perforated bottom 12A and in combination with the disperser tube acts as an airlift, in that the column of mixed air and liquid therein rises to an overflow 18, from which the liquid drops into the reservoir, the air escaping through a vent 19 in the cap. The perforated bottom keeps the charcoal out of the cylinder.

A generator anode 20, for the production of bromine, is disposed in the lower portion of the cylinder below the liquid level, and its companion generator cathode 21, from which hydrogen is liberated, is disposed in the outer reservoir.

A saturated calomel observer electrode 22 is disposed in the outer reservoir and a companion platinum observer electrode 23 is disposed in the cylinder a short distance above the generator anode.

The four electrodes are connected to leads 24, 25, 26, 27 which pass through the cap, to which the cylinder is also attached.

The two observer electrodes 23, 22 are connected respectively to two input terminals 50A, 50B of a vacuum tube power amplifier 28, the output terminals 83, 84 of which are connected respectively to the generator electrodes 21, 20.

An ammeter 29 is connected between the amplifier and the generator anode.

The operation of the apparatus is as follows:

When no mustard gas is being absorbed in the cell, i. e. when there is none in the entering air stream, the generating electrodes produce bromine from the acidified potassium bromide electrolyte of the pool at a very low constant rate. Thus "zero" current to the generating electrodes from the amplifier output is adjusted to about 0.1 milliampere when there is no mustard gas input, giving a small initial bromine excess. The bromine is formed within the cylinder at the generator anode.

When there is mustard gas in the entering air sample, which is forced to flow through at a constant rate—conveniently one liter per minute—it reacts quantitatively with the bromine formed at the generator anode, and produces a change in the potential between the observing electrodes. Thus the observer electrodes detect potentiometrically changes in the bromine concentration resulting from changes in the rate of addition of the mustard gas, the half-cell potential of the platinum observer electrode being used as a measure of bromine concentration.

The observed potential is applied to the input of the electronic power amplifier and the change in observed potential causes the amplifier to change the bromine generating current in the opposite direction, so that an increase in observed bromine concentration brings about a reduction in the rate of generation of bromine, thereby bringing about a compensation and tending to regulate the current so that the bromine generated in unit time is just sufficient to react with the mustard gas introduced in the same time. The power amplification of the amplifier is adequate to produce large current changes for very small changes in observed potential. Consequently, the initial bromine excess corresponding to "zero" current is restored quickly following any abrupt change.

Since the change in the bromine measuring current is a direct measure of the change in the rate of consumption of bromine by the mustard gas, the record of the amplifier output is representative of the mustard gas concentration in the air sample.

The bromide electrolyte supply in the reservoir is large enough to supply bromine for a very long period even when the mustard gas concentration in the sample is relatively high and, of course, it is a simple matter to replace the solution if and when it becomes exhausted. Further, the titration of mustard gas does not in itself cause depletion of the bromide contained in the cell.

The solution from the reservoir circulates through the bed of charcoal in passing into the inner cylinder or cell, and bromine and other reaction products are thus absorbed and prevented from affecting the platinum observer electrode. The charcoal also removes from solution any mustard gas which may have escaped titration during a period of very rapid increase in the rate of mustard gas input.

Hydrogen produced at the generator cathode in the outer reservoir escapes with the exhaust air through the vent.

The agitation due to the flow of a relatively large volume of air through the small reaction space distributes the generated bromine and mustard gas and produces homogeneity in the reaction mixture which eliminates "hunting" due to unrepresentative fluctuation of observed potential and to time lag between the instant of generation of a quantity of bromine and the establishment of equilibrium involving the reaction of this bromine near the observing electrode.

In the particular cell illustrated in Figs. 2 and 3, the outer container is a 16 ounce glass screw top bottle fitted with a cap of machined plastic, say methyl methacrylate resin, and the inner cylinder is a similar plastic. The bottom of the inner cylinder is closed by a perforated plastic plate.

As indicated, the absorber solution from which the bromine is generated may be 3 formal sulfuric acid containing potassium bromide at about 0.06 formal concentration, but neither concentration is critical.

To consider the amplifier in detail, it is a five tube, three stage, direct coupled structure powered by small dry cells to facilitate carrying. As will appear hereinafter, it is effectively a two stage amplifier, the central stage serving merely to isolate the end stages from each other. Thus the amplifier shown in Fig. 4 functionally is in three sections. These are the voltage amplification stage, the isolation stage, and the power output stage.

The amplifier stage comprises two first tubes and associated circuit elements, to be described hereinafter. The function of this stage is twofold; first, it is required to provide high voltage gain for D. C. signals, and second, it is required to discriminate among the alternating components of the signals being amplified in such a way that only the very low frequency components of the signals are amplified appreciably. The manner in which the above mentioned discrimination is carried out depends on the choice of the associated circuit elements employed.

The isolation stage consists of two cathode follower circuits in push-pull arrangement. This stage serves to absorb potential inequalities between the input terminals 50A, 50B of the circuit and its output terminals 83, 84, and to provide very high impedance between the input and output terminals. If these potential inequalities were not so absorbed, they would result in polarization of the electrodes used in conjunction with the amplifier. The isolation stage serves also to prevent the shunting of the load of the amplifier stage by the grid impedance of the power output stage.

The power output stage (or simply the "output stage") delivers current to the metering elements and the associated electrode system in accordance with the dictates of the potential signals received from the preceding stages. To perform correctly, it is necessary that the effective generator impedance of the stage be much larger than the load impedance under operating conditions.

The amplifier stage contains two "1N5" type vacuum tubes or equivalent, one (53) being designated the "amplifier" tube and the other (54) the "load" tube. Signals are supplied to the amplifier at the input terminals 50A, 50B. The effective impedance seen rightward from these terminals is essentially the grid impedance of the amplifier tube 53.

Very small currents are drawn from the signal source. The signal is applied between grid and cathode of the amplifier tube in series with a source of bias potential consisting of potentiometers 51A, 51B, a battery 52 and a switch 55 in series. By adjustment of the potentiometers, one coarse, the other fine, the grid-cathode potential of the amplifier tube may be brought to a satisfactory operating value.

As already indicated, the amplifier tube is a pentode. The cathode is heated by a current from a battery 57. The suppressor grid is connected to the cathode. The screen potential is supplied by a battery 56. The plate potential is derived from two batteries 56 and 58.

The impedance into which the amplifier tube operates is, in part, the plate resistance of the load tube 54, a pentode having characteristics similar to those of the amplifier tube. The screen grid potential for the load tube is derived from a battery 58. The cathode is heated by another battery 59. The suppressor grid is connected to the cathode. The grid of the load tube is connected to a reactive network consisting of resistors 60, 61 and a condensor 62 and a switch 63, which permits the resistor 61 to be switched out of the circuit. One end of the reactive network connects indirectly to the cathode of the load tube through the cathode resistor 64. The other end is connected to the cathode of the amplifier tube (53). If the resistor 64 were omitted, the load tube together with the reactive network might be said to constitute a "reactance tube" circuit.

The arrangement of the plate supply batteries 56, 58 with respect to the various other circuit elements avoids the use of separate batteries to supply bias voltages to the screen grids of the two tubes of the amplifier stage and to the grids of the subsequent stage. Also, the variable resistor 65 and another resistor 66 permit the operating grid biases on tubes of the isolation stage to be adjusted to suitable values.

The behavior of the circuit may be illustrated by the following example. Assume that the potentials and currents in the amplification stage correspond to satisfactory operation. By means of a potential applied between the terminals 50A, 50B, the control grid of the amplifier tube 53 is made more positive with respect to the cathode. The plate-to-cathode potential drop across the tube (53) is decreased, and in consequence a greater potential drop must be accounted for by the cathode resistor 64 and the load tube 54, since the sum of the drops mentioned must equal the voltage impressed by the two plate supply batteries, 56 and 58. Because part of the potential change is across the resistor 64, which connects (insofar as equilibrium values are concerned) the grid of the load tube to its cathode, the tendency of the load tube to assume a greater share of the potential drop is greatly enhanced, with the result that the plate to cathode potentials of the load tube and amplifier tube undergo changes roughly twice as great as would occur in the absence of the cathode resistor 64. And the changes are complementary.

What has been said above applies only to the changes achieved after equilibrium has been established. However, by the action of the reactive network associated with the grid of the load tube, the amplifier stage discriminates among the alternating components of the signals which it amplifies, the amplification being lower the higher the frequency up to a limit above which no further discrimination occurs (in this particular case). (By alternating components we mean here the relative amplitudes of the frequency distribution of the applied change or signal, such a frequency distribution being known as the "spectrum" of the applied signal.)

As the potential drop across the amplifier tube 53 decreases due to an increasingly positive grid signal, the voltage across the reactive network (60, 61, 62, 63) must decrease the same amount. Because the charging potential has decreased, the condensor 62 discharges through the resistors 60, 61 or through the resistor 60 alone. In the former case, the flow of positive current upward through the resistor 61 impresses a positive voltage on the grid of the load tube. This positive voltage tends to cancel during the transient period the negative grid potential produced by the resistor 64, and thus operates to prevent the change of potential across the load tube. This effect would still be observed if the resistor 64 were removed from the circuit.

When the switch 63 is in a position to delete the resistor 61, no transient bias is applied to the grid of the load tube. However, the network consisting of resistor 60 and condensor 62 decreases the amplification of the stage by shunting the load tube in increasing measure the higher the frequency of the component. This effect is always present in addition to the "reactance tube" effect described above, but the reactance tube operation is more effective by a large factor.

In summary, the amplifier stage provides high amplification in a single stage, employs a small number of batteries for both plate supply and bias use, and provides strong attenuation of high frequency signal components by employing a reactive circuit connected to the grid of the load tube in such a way to render that tube reactive (i. e. largely capacitative in effect).

The isolation stage consists of two vacuum tubes (67, 68) operating as "cathode followers" in push-pull. The tubes shown are pentodes, but they are operated as triodes (and actually may be triodes), the screen grids being connected to the respective plates. The suppressor grid of each tube is connected to its cathode. Each tube has a cathode load resistor, 69, 70. A single plate battery (71) supplies both tubes. Each filament is supplied by its own battery (73, 74). A grid resistor 72 is connected between the grid of the lower tube 68 and the negative side of the plate supply battery.

The duty of the isolation stage is to provide a very high impedance between the input terminals and the output terminals of the amplifier without interfering with the transmission of signals through the amplifier. To illustrate the behavior of this stage, let it be assumed that both cathode follower grids become positive with respect to their cathodes. The currents in both plate circuits will increase until the grid cathode potentials of both tubes have been restored effectively to their original equilibrium values because of increased current flow through the resistors 69 and 70. The potential across each of the cathode resistors (69, 70) has changed, but the potential across both resistors is essentially the same as it was before the grid potentials were altered. If the grid-to-grid potential is varied, on the other hand, the overall potential across the resistors 69, 70 varies in the same way. This stage plays the role of a universal joint which avoids difficulties due to misalignment while transmitting the desired signals. As a result of the use of the isolation stage described, it is found that the amplifier operates satisfactorily over a relatively broad range of voltages externally imposed between the terminals 50B, 84.

The output stage consists of a pentode 75 (which may be a triode or tetrode) operated in the case shown as a triode. The grid potential is taken across the two cathode resistors of the isolation stage. Filament power is supplied by a battery 85 and plate power is derived from a battery 76. The terminals 83 and 84 are the output terminals to which the load is attached, for example, the generator electrodes.

The circuit comprising a battery 78, switches 95 and 82, and resistors 80, 81 has as its object the suppression of zero-point current in the metering circuits which are in parallel with it. The metering circuit consists of a recording meter 86, its shunting switch 87 and scaling switch 79 and resistor 88, an indicating ammeter 89, its scaling resistors 90, 91 and switch 79, an integrating device 92, a switch 93 for inserting or removing the integrator, and a protective fuse 94.

The phase relationships throughout the amplifier shown are such that when input terminal 50A is made more positive with respect to the terminal 50B, the change in output current is equivalent to positive current flow through an external load from the terminal 83 to the terminal 84. That is, the plate current of the output circuit decreases when the input grid potential is increased.

The operation conducted in the apparatus of Figs. 1, 2 and 3 is a continuous titration in which a continuous indication or record of the concentration of mustard gas in the succeeding portions or flow of a gas sample passing through the apparatus is obtained. The following example, which is illustrated by Fig. 5, is one in which a batch sample is titrated, the particular batch being a liquid—although a batch sample of gas can be titrated with equal facility.

Figure 5:
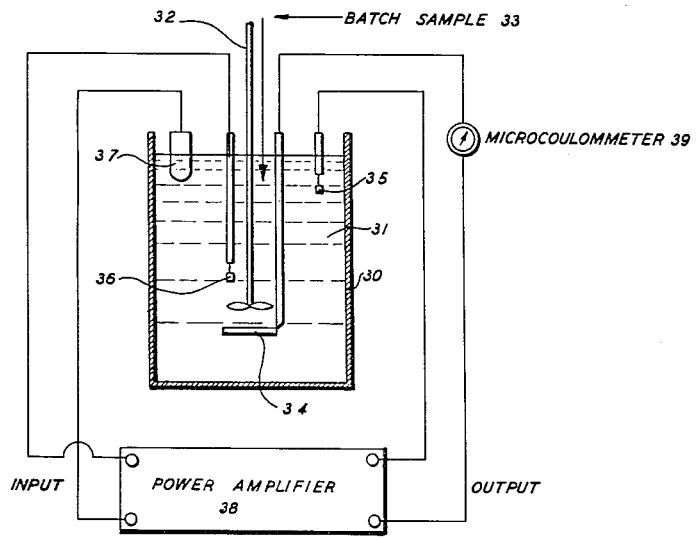
Fig. 5 is a schematic diagram illustrating the application of the invention to the analysis of a batch sample of gas or liquid.

Referring to Fig. 5, the apparatus in general is similar to that of Fig. 1, except that the interior cell is omitted. Thus the apparatus comprises a vessel 30, for example a small beaker, which contains a pool of electrolyte 31, for example an acidified solution of a soluble bromide. A motor driven agitator 32 is provided in the container to assure adequate mixing of the electrolyte and a batch sample 33, the introduction of which is indicated. The batch sample may well be a water solution containing dissolved hydrogen sulfide, the concentration of which is to be determined.

The arrangement of electrodes and power amplifier in the apparatus of Fig. 5 is the same as that in the apparatus of Fig. 1. Thus a generator anode 34 for the production of bromine is disposed in the pool and its companion generator cathode 35 is also located in the pool at a point remote from the anode.

A platinum observer electrode 36 is located in the pool, and a saturated calomel observer electrode 37 is located in the pool. The two observer electrodes are connected to the input of a vacuum tube power amplifier 38 constructed in accordance with Fig. 4 and the output terminals of this power amplifier are connected respectively to the generator electrodes, a microcoulommeter 39 being connected between the power amplifier and the generator anode.

The operation of the apparatus of Fig. 5 is as follows:

The controls of the amplifier are adjusted to provide small concentration of bromine in the solution. The sensing of the bromine causes the generator current to be shut off automatically. The batch sample is introduced; it exhausts the bromine supply very rapidly by reaction. Thereafter, the action of the apparatus is the same as that described in connection with Fig. 1 except that the microcoulommeter, since it reads coulombs rather than amperes, gives a measure of the total amount of hydrogen sulfide present in the sample. Thus, hydrogen sulfide, like mustard gas, reduces bromine, and the power amplifier actuated by the observer electrodes produces a controlled amount of charge sufficient to generate the bromine necessary to react with the hydrogen sulfide and then stops. The charge (in coulombs) involved in the generation of the bromine is a direct measure of the amount of hydrogen sulfide in the sample.

The apparatus of Fig. 5 can be adapted easily to the measure of a constituent in a gas sample, since it is only necessary to introduce the batch sample of gas in such fashion that the constituent to be analyzed is absorbed completely in the pool. For example, the gas sample could be pumped into the pool through a tube at a rate such that its hydrogen sulfide content was not introduced more rapidly than it could react with the bromine.

Figure 6:
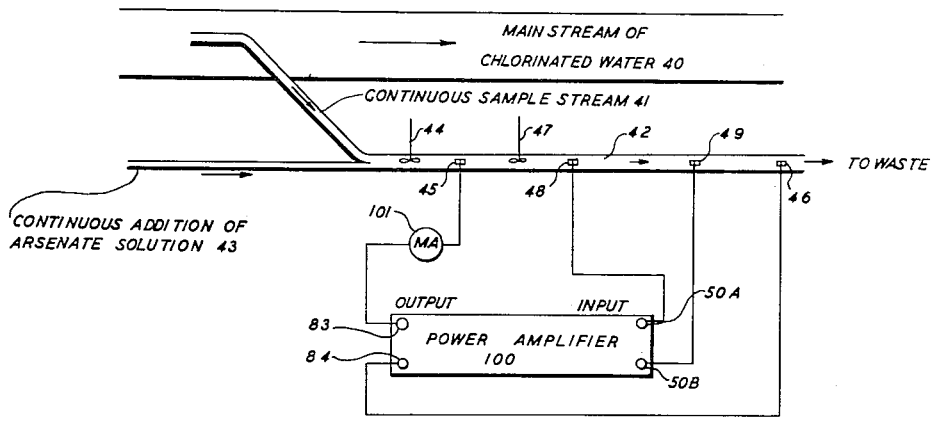
Fig. 6 is a schematic diagram illustrating the application of the invention to the continuous quantitative analysis of a liquid stream, say the water effluent of a chlorinating system.

Fig. 6 illustrates an example of the practice of the invention wherein a stream of liquid is analyzed continuously. A main stream 40 of chlorinated water, say the effluent of a water-supply chlorinating system, is sampled by withdrawing from it continuously (say by pumping) at uniform volume-rate a sample stream 41. This stream passes into a cell 42 which is simply a closed conduit. A reagent supply 43 is likewise introduced into the head end of the cell continuously. Thus a small continuous addition of a soluble arsenate, say sodium arsenate, is accomplished, the amount of arsenate being considerably in excess of that required for the reaction. An agitating device, say an impeller 44 is disposed in the cell at its head end followed by a generating cathode 45, the companion anode 46 of which is placed down stream in the cell or at any other convenient point to complete the electrical circuit.

Down stream in the cell, following the generating cathode, is a second agitating means 47 followed by an observer electrode 48, the companion 49 of which is disposed still further down stream. The two generating electrodes are connected to the output of a vacuum tube power amplifier 100, and the two observer electrodes are connected to the input of this amplifier. A current measuring device, say a milliammeter 101, is connected between the generating cathode and the output of the amplifier.

Figure 4:
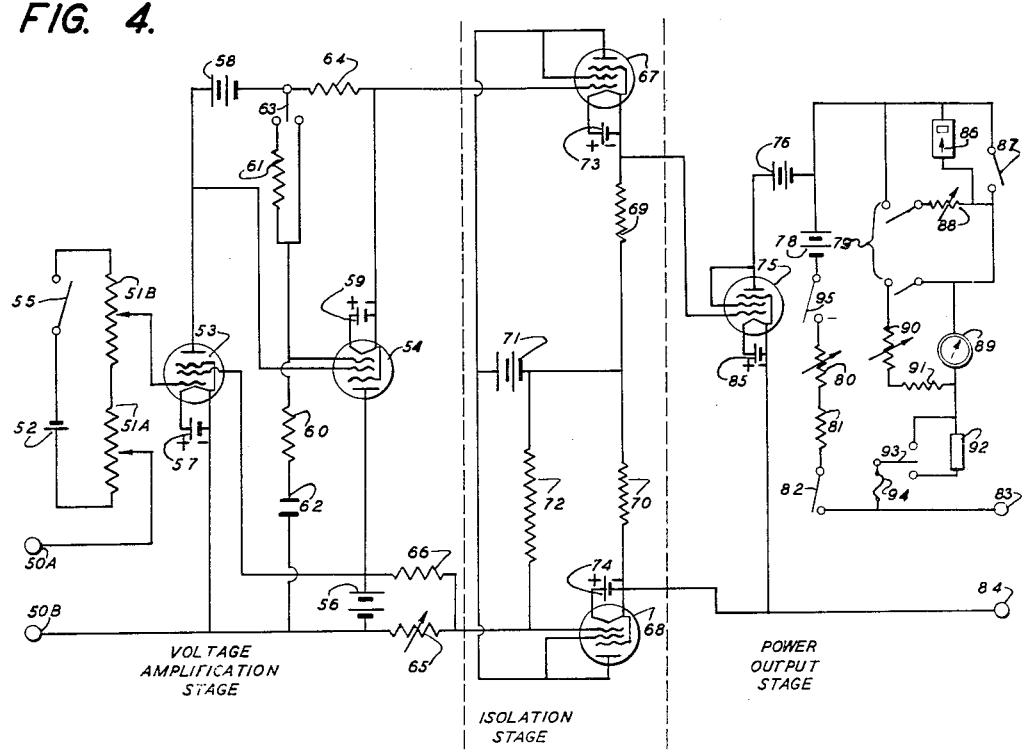
Fig. 4 is a wiring diagram of the power amplifier of Fig. 1.

The power amplifier may be constructed in accordance with Fig. 4, but is connected so that the current to the generating electrodes increases as the observed chlorine increases. Thus the input terminals of the amplifier of Fig. 6 are reversed with respect to those of Fig. 1. Another important difference is that the effective generating electrode of Fig. 6 is a cathode instead of an anode.

The operation of the apparatus of Fig. 6 is as follows:

The arsenate solution is mixed with the chlorinated water ahead of the generating cathode and at the cathode some of the arsenate is reduced to arsenite. The arsenite in the stream then reacts with the chlorine and is reconverted to arsenate and the "zero" of the apparatus is so set that it is the residual chlorine unreacted with the arsenite which is measured potentiometrically by the observer electrodes. The amplifier responds automatically to variations in the titration result and increases the amount of arsenite generated as the residual chlorine measured by the observer electrodes increases. Thus the milliammeter connected in the output of the power amplifier measures the amount of arsenite required to combine with the residual chlorine of the sample and gives a continuous indication of the chlorine content of the sample and likewise of the main stream.

An example of the practice of the invention in which the "generating" electrodes are employed to consume an excess of the titrating agent may be illustrated as follows:

A cell somewhat similar to that illustrated in Fig. 5 may be employed to determine the amount of chloride ion present in a liquid sample. The sample, of, say aqueous sodium chloride solution, is placed in the cell. A measured quantity of solution containing a known concentration of silver nitrate is added with stirring in amount sufficient to give an excess of silver ion. The silver reacts with the chloride to form silver chloride precipitate and leave an excess of silver ion. Potassium chromate is added as an indicator and in the presence of silver ion produces a brown turbidity. A pair of platinum electrodes disposed in the cell and connected through a microcoulommeter to a direct current source are employed to consume the excess silver, which is deposited at the cathode, the endpoint being indicated by disappearance of the brown turbidity. The coulombs employed to eliminate the turbidity are a measure of the silver excess and indirectly a measure of the chloride originally present.

Endpoint indication may also be obtained in the foregoing case with a silver electrode in the cell connected through a salt bridge to a reference electrode disposed in a second vessel. The salt bridge may be composed of agar-agar and ammonium nitrate and should, of course, be chloride-free. The reference electrode may be a silver-silver ion electrode and the second vessel contains a reference solution containing a known concentration of silver. The potential established between these two observing electrodes then becomes a measure of the concentration of silver remaining in the cell at any stage in the electrolysis.

The invention permits titrations to be made much more rapidly than heretofore and with increased accuracy. Errors due to faulty manipulation are much reduced, and the difficulties due to sticking and leaking burettes and other titration apparatus with moving parts for the control of the titrating agent are completely eliminated. Moreover, continuous titration and automatic control attainable through the practice of the invention afford outstanding advantages.

The apparatus of the invention may be employed to detect as little as .07 part per million of mustard gas. The method and apparatus is accurate to about plus or minus 2% of the absolute concentration of mustard gas at full scale operation. For example, if full scale represents approximately six parts per million of mustard gas, the accuracy of this value will be approximately plus or minus 0.1 part per million.

I claim:

1. In an automatic titrating mechanism for the quantitative determination of a first reactant in a fluid, the combination which comprises a cell into which the fluid is introduced, electrolytic means for generating a second reactant for reaction to an end point in the cell with the first reactant, end point sensing means in operative association with the cell for producing a potential difference which changes as the excess of one of the reactants in the cell changes from the end point, an electronic power amplifier of high transconductance having its input connected to the end point sensing means and its output connected to the electrolytic means to supply power thereto for generating the second reactant and so arranged that its output current varies in response to the change in the potential difference, and means including a reactive circuit connected between the end point sensing means and the electrolytic means for more strongly attenuating high frequency components of the amplifier input than low frequency components of the amplifier input.

2. In an automatic titrating mechanism for the quantitative determination of a first reactant in a fluid, the combination which comprises a cell into which the fluid is introduced, electrolytic means for generating a second reactant for reaction to an end point in the cell with the first reactant, end point sensing means in operative association with the cell for producing a potential difference which changes as the excess of one of the reactants in the cell increases from the end point, an electronic power amplifier of high transconductance having its input connected to the end point sensing means and its output connected to the electrolytic means to supply power thereto for generating the second reactant and so arranged that its output current varies in response to the change in the potential difference, means including a reactive circuit connected between the end point sensing means and the electrolytic means for more strongly attenuating high frequency components of the amplifier input than low frequency components of the amplifier input, and means for preventing the passage of current from the electrolytic generating means to the end point sensing means externally of the cell.

3. In an automatic titrating mechanism for the quantitative determination of a first reactant in a fluid, the combination which comprises a cell into which the fluid is introduced, electrolytic means for generating in the cell a second reactant for reaction in the cell with the first reactant to an end point, potentiometric means connected to the cell for determining a potential difference existing in the cell due to the presence of an excess of one of the reactants, an electronic power amplifier of relatively high transconductance having its output connected to the electrolytic means and its input connected to the potentiometric means and so arranged that the output current of the amplifier is varied in response to a change in the potential difference, means including a reactive circuit connected between the potentiometric means and the electrolytic means for more strongly attenuating high frequency components of the amplifier input than low frequency components of the amplifier input, and an isolation stage in the amplifier for preventing the passage of current between the electrolytic means and the potentiometric means externally of the cell.

4. Apparatus according to claim 3 in which the potentiometric means senses an excess of the first reactant with resultant increase of potential difference and in which the amplifier has a current output that increases as the potential difference increases.

5. Apparatus according to claim 3 in which the potentiometric means senses an excess of the second reactant with resultant increase of potential difference and in which the power amplifier has a current output that decreases as the potential difference increases.

References Cited in the file of this patent

UNITED STATES PATENTS

| | | |
|---|---|---|
| 1,944,738 | Grebe et al. | Jan. 23, 1934 |
| 2,021,519 | Polin | Nov. 19, 1935 |

FOREIGN PATENTS

| | | |
|---|---|---|
| 282,170 | Great Britain | Dec. 20, 1927 |

OTHER REFERENCES

Publication: "Transactions of the Electrochemical Society," vol. 76 (1939), pages 303 thru 308. Article by Campbell et al, entitled "Tarnish Studies."

"Chemical Abstracts," vol. 32 (1938), page 5325; abstract of publication by Szebelledy et al.

Report of Office of Technical Services, Publications Board No. 5940, released Mar. 8, 1946, "An Automatic Recording Titrimeter For Mustard," by Briglio, Brockman and Shaffer.